United States Patent Office 2,850,386
Patented Sept. 2, 1958

2,850,386
PROCESS FOR PREPARING AN ENTERAL FEEDING SOLUTION

John Elliott, Miami, Fla.; Security Trust Company, executor of the estate of said John Elliott, deceased, assignor to Dade Reagents, Inc., Miami, Fla., a corporation of Florida No Drawing. Application June 18, 1952
Serial No. 294,270

2 Claims. (Cl. 99—14)

This invention relates to a process for producing a stable, sterile, nutritional solution designed for continuous enteral tube feeding by drip method. Solutions processed by this method are not intended for administration by any other feeding technique. It incorporates a new combination of pH adjustment and sterile filtration which achieves asepsis and controls bacterial growth and contamination during administration. The method for sterilization inhibits the formation of toxic substances which are normally produced by heating or by chemical sterilization. The method here employed is adjustment of pH before filtering through asbestos pads, fritted glass and other material of such small pore diameter as to retain bacteria. This process produces a product that is sterile, stable, and with minimal formation of sediment on standing.

The product is a mixture of protein, such as lactalbumin, casein, whole milk, hydrolysates of milk proteins, beef or other proteins or protein hydrolysates, mixed with carbohydrates, such as sucrose, corn syrup, invert sugar, dextrose and others, and sufficient minerals so that the mixutre will be nutritionally adequate.

Research on over 850 patients indicates that a large number of the patients to whom this material was administered in the proper dosage and with the method here recommended were maintained in good nutrition for long periods with only a vitamin supplement. The longest period of administration to date has been 16 months, with a weight gain of 45 pounds.

Investigations have indicated that there is a definite advantage in feeding sick patients a sterile, nutritionally adequate formula by passing a small plastic tube through the nose and into the stomach or duodenum and allowing the feeding formula to drip constantly 24 hours a day at a prescribed rate of flow so as to administer 1,000 to 3,000 cc. per 24-hour period. Previous investigators have used formulas which in some instances were similar to the one proposed, and in others, markedly different. Their products, for the most part, have not been sterile nor stable, and have caused toxic symptoms, such as nausea, vomiting and diarrhea. I encountered similar experiences until it was found that the method of preparation was responsible for the untoward reactions, and that pH adjustment is the most important factor in controlling contamination during processing and administration. Heat sterilization of mixtures containing large amounts of amino acids, carbohydrates and minerals apparently results in the formation of complexes which cause nausea, vomiting and diarrhea when administered in clinical quantities.

I have now developed a preparation of high protein and high carbohydrate feeding solution which, when administred by enteral drip method, causes none or minimal untoward symptoms in human subjects. In the preparation of this solution it has been found most advantageous to adjust the hydrogen ion concentration between the pH range of 4.0 to 6.2 (optimum being 5.0) by the use of acids such as lactic, citric, hydrochloric, etc. The combination of low pH and sterilization by sterile filtration not only prevents the formation of toxic factors, but contributes enormously to the ease of satisfactory production, administration and stability of the product. First, it controls bacterial growth in processing; second, it inhibits bacterial growth during periods of administration; third, it increases stability of the product; fourth, it increases the speed of the sterile filtration; and fifth, it allows larger amounts of formula to be processed through the bacterial retentive filter by inhibiting the growth of organisms during processing.

It is, therefore, evident that sterility of the feeding solution is required in order that it may be stored for long periods wtihout deterioration, so that it may be readily available. In addition, the solutions are given at rates requiring 8 to 12 hours per bottle. Contamination during this period may be due to bacterial growth causing deterioration of the solutions and untoward reactions in the patient. Solutions which have not been acidified in the manner previously taught are an excellent growth medium for ordinary contaminants.

It is required that typical formulas provide daily (1) an excess of amino acids from the protein hydrolysate, (2) sufficient cabohydrate (usually about two or more parts to one part of protein), (3) the daily requirement of water, (4) adequate amounts of electrolytes and trace amounts of minerals based on their presence in milk, (5) approximately 0.1 to 6 grams of sodium chloride (unless edema contra-indicates its use), and (6) ethyl alcohol as required to increase the caloric content. In addition, vitamins must be supplemented orally or parenterally.

Typical formulas as illustrated in the table below. The defatted protein hydrolysate was prepared in our laboratories. It is essentially a mixture of peptones, proteoses, and polypeptides with smaller amounts of amino acids than present in the lactalbumin hydrolysate. This formula was well tolerated and is considered the formula of choice when stability is provided.

The basic arrangement of the formulas with regard to protein, carbohydrate, fluid and electrolytes was adjusted according to the demands of the patient. Adjustments have been made to meet unusual needs, such as in diabetes or edema. In addition, the amount and make-up of formulas were varied according to whether the feeding was the sole dietary intake or a supplement to other food. Ethyl alcohol was useful in increasing the caloric value of the solution and had desirable effects in patients requiring mild sedation.

Composition of typical feeding formulas (approximate grams per liter)

|  | Lactalbumin hydrolysate | | | Defatted milk hydrolysate |
|---|---|---|---|---|
| Protein | 50.0 | 75.0 | 75.0 | 50.0 |
| Carbohydrate | 150.0 | 150.0 | 150.0 | 150.0 |
| Calcium | 0.7 | 0.7 | 0.7 | 2.0 |
| Potassium | 0.5 | 0.5 | 0.5 | 2.3 |
| Phosphorus | 0.5 | 0.5 | 0.5 | 1.5 |
| Magnesium | 0.1 | 0.1 | 0.1 | 0.1 |
| Sodium chloride | Trace | 2.0 | 2.0 | 2.0 |
| Sodium lactate |  |  | 1.5 | (?) |
| Ethyl alcohol |  |  | 20.0 |  |
| Calories provided | 800 | 900 | 1,050 | 800 |

The success which has been attained by the adjustment of pH to a value of from 4.0 to 6.2 prior to sterilization by filtration was entirely unexpected. For example, it is taught in the patent to Pingert et al., No. 2,432,970, that the use of high temperature is not applicable to the destruction of pyrogens in solutions sensitive to high temperatures, and that other methods of destroying pyrogens, such as treatment with acids or alkalies, or filtration through asbestos pads, are not suitable with solutions of enzymotic protein hydrolysates, because such solutions cannot be heated above 120° C. without injury, they cannot be made strongly acid or alkaline without losing at least part of their clinical value, and the removal of pyrogens from such solutions by filtration is impractical due to the presence of high molecular substances, such as peptides, in the protein hydrolysates.

I have found that the use of a hydrogen ion concentration in the range specified does not cause undue loss of clinical value of the nutritional solution, and further, find that the use of filter material having a very small pore diameter can be satisfactorily performed upon the acidified solution.

I claim:

1. A process for producing a sterile, stable, enteral tube drip feeding solution having a pH of about 5.0 consisting essentially of proteinaceous material selected from the group consisting of soluble proteins and amino acids, at least approximately two parts of a sugar for each part of protein or amino acid, water, and sufficient minerals so that the solution will be nutritionally adequate when vitamins are supplemented, which comprises incorporating in the solution a sufficient amount of acid to cause the solution to have a pH of about 4.0 to 6.2, and then filtering said acid solution through a filter having a pore diameter of a size sufficiently small as to retain bacteria, said process being carried out at ambient temperature.

2. A process as recited in claim 1 in which the feeding solution also contains ethyl alcohol.

References Cited in the file of this patent

UNITED STATES PATENTS

| | | |
|---|---|---|
| 2,411,897 | Sahyun | Dec. 3, 1946 |
| 2,432,970 | Pingert et al. | Dec. 16, 1947 |
| 2,456,297 | Melnick | Dec. 14, 1948 |
| 2,457,820 | Howe et al. | Jan. 4, 1949 |

FOREIGN PATENTS

| | | |
|---|---|---|
| 475,565 | Great Britain | 1936 |

OTHER REFERENCES

American Journal of Pharmacy, September 1946, pages 317 and 318.

Physicians Bulletin, June 1947, pages 79, 80 and 81.